United States Patent
Wang et al.

(10) Patent No.: US 9,887,773 B2
(45) Date of Patent: Feb. 6, 2018

(54) WAVELENGTH DIVISION MULTIPLEXING TRANSISTOR OUTLINE (TO)-CAN ASSEMBLIES FOR USE IN OPTICAL COMMUNICATIONS AND OPTICAL COMMUNICATIONS MODULE INCORPORATING SAME

(71) Applicant: Avago Technologies General IP (Singapore) Pte. Ltd., Singapore (SG)

(72) Inventors: Kou-Wei Wang, Orefield, PA (US); Ayman Kanan, Allentown, PA (US); Chih-Chi Lin, Manalapan, NJ (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/269,828

(22) Filed: Sep. 19, 2016

(65) Prior Publication Data
US 2017/0093488 A1    Mar. 30, 2017

Related U.S. Application Data

(63) Continuation-in-part of application No. 14/871,113, filed on Sep. 30, 2015.

(51) Int. Cl.
*H04B 10/079*    (2013.01)
*H04J 14/02*    (2006.01)
(Continued)

(52) U.S. Cl.
CPC ..... *H04B 10/07955* (2013.01); *G02B 6/2773* (2013.01); *G02B 6/2938* (2013.01);
(Continued)

(58) Field of Classification Search
CPC ............ H04B 10/07955; G02B 6/2773; G02B 6/4292; G02B 6/4208; G02B 6/2938;
(Continued)

(56) References Cited

U.S. PATENT DOCUMENTS 4,767,171 A * 8/1988 Keil ..................... G02B 6/4246
                                                        385/35
5,552,918 A * 9/1996 Krug .................... G02B 6/4207
                                                        385/33
(Continued)

FOREIGN PATENT DOCUMENTS

CN           203616510 U        5/2014

OTHER PUBLICATIONS

"CWDM4 4x25Gb/s TOSA", Product Brief, Avago Technologies, Dec. 3, 2015.
(Continued)

*Primary Examiner* — John M Bedtelyon (57) ABSTRACT

A wavelength division multiplexing (WDM) transistor-outline (TO)-can assembly is provided that is capable of transmitting optical data signals having multiple wavelengths. The WDM TO-can assembly can be packaged in a relatively small package without requiring a large amount of plant retooling or capital investment, and that can be made available in the market relatively quickly. A plurality of the WDM TO-can assemblies can be incorporated into a small form factor or C form factor pluggable-type optical communications module to achieve high data rates.

29 Claims, 4 Drawing Sheets

(51) Int. Cl.
*G02B 6/42* (2006.01)
*G02B 6/293* (2006.01)
*G02B 6/27* (2006.01)

(52) U.S. Cl.
CPC ......... *G02B 6/29362* (2013.01); *G02B 6/428* (2013.01); *G02B 6/4208* (2013.01); *G02B 6/4263* (2013.01); *G02B 6/4286* (2013.01); *G02B 6/4292* (2013.01); *H04J 14/0227* (2013.01)

(58) Field of Classification Search
CPC .... G02B 6/428; G02B 6/4263; G02B 6/4286; G02B 6/29362; H04J 14/0227
See application file for complete search history.

(56) References Cited

U.S. PATENT DOCUMENTS

| | | | | |
|---|---|---|---|---|
| 5,663,821 A * | 9/1997 | Suda | ............. | G02B 6/4246 257/81 |
| 6,731,882 B1 * | 5/2004 | Althaus | ............. | G02B 6/4246 257/E31.095 |
| 6,769,816 B2 | 8/2004 | Capewell et al. | | |
| 6,954,592 B2 * | 10/2005 | Tan | ............. | G02B 6/4206 398/135 |
| 7,088,518 B2 * | 8/2006 | Tatum | ............. | G02B 27/145 359/589 |
| 7,176,436 B2 | 2/2007 | Zheng et al. | | |
| 7,438,480 B2 * | 10/2008 | Okada | ............. | G02B 6/262 359/628 |
| 7,450,858 B2 * | 11/2008 | Verdiell | ............. | H01S 5/4087 398/164 |
| 7,995,928 B2 * | 8/2011 | Du | ............. | G02B 6/29362 398/135 |
| 8,160,451 B2 * | 4/2012 | Liu | ............. | G02B 6/4201 398/135 |
| 8,540,437 B2 * | 9/2013 | Lee | ............. | G02B 6/4215 385/31 |
| 8,641,298 B2 * | 2/2014 | Lim | ............. | G02B 6/4246 385/14 |
| 8,854,836 B2 * | 10/2014 | Deng | ............. | G02B 6/428 361/807 |
| 8,985,871 B2 * | 3/2015 | Mizobuchi | ............. | G02B 6/43 385/14 |
| 9,020,308 B2 * | 4/2015 | Lim | ............. | G02B 6/3628 385/14 |
| 9,164,247 B2 * | 10/2015 | Amit | ............. | G02B 6/4201 |
| 9,213,156 B2 * | 12/2015 | Amit | ............. | G02B 6/4206 |
| 9,250,401 B2 * | 2/2016 | Lim | ............. | G02B 6/4215 |
| 9,435,711 B2 * | 9/2016 | Wu | ............. | H04B 10/071 |
| 9,696,503 B2 * | 7/2017 | Lin | ............. | G02B 6/4209 |
| 2003/0152336 A1 * | 8/2003 | Gurevich | ............. | G02B 6/4206 385/88 |
| 2004/0146304 A1 * | 7/2004 | Kuhara | ............. | G02B 6/4206 398/138 |
| 2006/0088255 A1 * | 4/2006 | Wu | ............. | G02B 6/2938 385/92 |
| 2007/0159773 A1 | 7/2007 | Deng et al. | | |
| 2009/0310920 A1 * | 12/2009 | Kim | ............. | G02B 6/4214 385/88 |
| 2014/0355997 A1 | 12/2014 | Miao et al. | | |

OTHER PUBLICATIONS

English language machine translation of CN203616510U, published May 28, 2014.

* cited by examiner

FIG. 4

WAVELENGTH DIVISION MULTIPLEXING TRANSISTOR OUTLINE (TO)-CAN ASSEMBLIES FOR USE IN OPTICAL COMMUNICATIONS AND OPTICAL COMMUNICATIONS MODULE INCORPORATING SAME

CROSS-REFERENCE TO RELATED APPLICATIONS

This application is a continuation-in-part application and claims priority to U.S. application Ser. No. 14/871,113, filed on Sep. 30, 2015, entitled "WAVELENGTH DIVISION MULTIPLEXING AND DEMULTIPLEXING TRANSISTOR OUTLINE (TO)-CAN ASSEMBLIES FOR USE IN OPTICAL COMMUNICATIONS, AND METHODS," which is hereby incorporated by reference herein in its entirety.

TECHNICAL FIELD OF THE INVENTION

The invention relates to transistor outline (TO)-can assemblies and transmitter optical subassemblies (TOSAs). More particularly, the invention relates to wavelength division multiplexing (WDM) TO-can TOSAs for use in optical communications modules.

BACKGROUND OF THE INVENTION

Optical transmitter modules used in optical networks for transmitting optical data signals come in a variety of configurations. A typical optical transmitter or transceiver module has a TOSA that includes at least one laser diode and various other electrical components. A laser driver circuit of the module, which can be either external to or internal to the TOSA, outputs an electrical drive signal to each respective laser diode to cause the respective laser diode to be modulated. When the laser diode is modulated, it outputs optical signals that have power levels corresponding to logic is and logic 0s. An optics system of the module couples the optical signals produced by each respective laser diode into the end of a respective transmit optical fiber held within an optical connector module that connects to the optical transmitter or transceiver module.

One well known type of optical communications module is a transistor outline (TO)-can assembly. A typical TO-can assembly includes a header and a cap. The header and the cap are typically made of a metallic material, such as stainless steel, for example, to allow them to be welded together. The TO-can assembly is generally cylindrical in shape. The header has an upper mounting surface on which the components of the TOSA are mounted, including a laser diode and other electric components, such as the laser diode driver circuitry. The components of the TOSA are electrically interconnected with proximal ends of electrical leads that pass through the header and have distal ends that are disposed on the opposite side of the header for electrically interconnecting the TOSA to external electrical circuitry, such as electrical circuitry of a printed circuit board (PCB).

TO-can assemblies are typically not used in WDM applications that use more than two wavelengths for a number of reasons. One reason is that TO-can packages are relatively bulky in size and shape and, therefore, are not well suited for incorporating multiple sets of discrete optics and other components that are needed for transmitting optical data signals of multiple wavelengths. Planar lightwave circuits (PLCs), also known as photonic integrated circuits (PICs), are better suited for WDM applications because they allow many optical, optoelectronic and electrical components to be integrated on the same substrate and packaged in a relatively small package. PLCs, however, require special equipment to manufacture them, which leads to large capital investments for plant retooling and time delays in bringing the products to market.

Although it is known to package bi-directional optical subassemblies (BOSAs) in TO-can packages, the existing BOSAs are only capable of using two wavelengths and therefore have only two TO-can devices. It is also known to make three-channel, or tri-, OSAs that have three TO-can devices. The BOSA and tri-OSA packages are also relatively large in size. In addition, due to the configuration of the focusing optics they employ, the known BOSAs and tri-OSAs are limited to having a wavelength spacing between the TO-can devices that is greater than 10 nanometers (nm), which limits the wavelengths that can be used by the BOSAs and tri-OSAs. The focusing optics system configuration also limits the number of channels and wavelengths to three at most due to limitations on the ability of the focusing optics to achieve a great enough focal length if more than three TO-can devices are included. Due to all of these limitations, the existing BOSAs and tri-OSAs are not practical for use in applications that require smaller packaging or in applications that require more than two or three wavelengths.

Cloud computing and next generation data center applications are driving very large demands for increased bandwidth and low-cost compact packaging. A need exists for a WDM TOSA assembly that is capable of transmitting optical data signals having more than three wavelengths and that can be packaged in relatively low-cost compact packages.

WRITTEN DESCRIPTION

In accordance with illustrative, or exemplary, embodiments, a compact, relatively low-cost WDM TOSA TO-can assembly is provided that is capable of transmitting optical data signals having at least four wavelengths at data rates of at least 25 Gigabits per second (Gbps) to achieve an overall data rate of at least 100 Gbps. The WDM TOSA TO-can assembly can be packaged in a smaller package than those used for existing BOSAs and tri-OSAs and can be manufactured without requiring a large amount of plant retooling or capital investment, thereby allowing them to be made available in the market relatively quickly and inexpensively.

In accordance with an illustrative embodiment, the TOSA TO-can assembly utilizes two dual-wavelength laser chips, each of which produces two light beams of two respective wavelengths, and a WDM filter or polarization beam combiner that combines the four light beams into a multi-wavelength optical signal and couples the multi-wavelength optical signal into the end of an optical fiber. In accordance with an illustrative embodiment, the TOSA TO-can assembly has features that allow the heights of the TO-can devices of the assembly to be relatively small compared to those employed in existing BOSA and tri-OSA assemblies. The smaller heights of the TO-can devices allow the TOSA TO-can assembly to be incorporated into optical communications module housings that are compliant with quad small form factor pluggable (QSFP) and C Form Factor Pluggable (CFP) standards or multi-source agreements (MSAs), such as, for example, QSFP+, QSFP28, CFP4 and coarse WDM4 (CWDM4) MSAs.

In accordance with an exemplary embodiment described below, two of the WDM TOSA TO-can assemblies are configured for use in modules that comply with the QSFP28 100 Gbps Ethernet (GE) MSA, with the CFP4 MSA and with the CWDM4 MSA. The term "quad small form factor pluggable-type," or "QSFP-type" as those terms are used herein, are intended to denote modules that are compatible with any of the QSFP standards or MSAs, including, but not limited to, the QSFP, QSFP+and QSFP28 standards or MSAs. The term "C form factor pluggable-type," or "CFP-type" as those terms are used herein, are intended to denote modules that are compatible with any of the CFP standards or MSAs, including, but not limited to, the CFP, CFP2 and CFP4 standards or MSAs. As will be understood by those skilled in the art, in view of the disclosure provided herein, the inventive principles and concepts are not limited to these standards or MSAs.

The WDM TOSA TO-can assembly can be manufactured using industry-standard TO-can manufacturing platforms and low-cost thin film processes for the optics systems so that there is very little, if any, capital investment for plant retooling. Consequently, the TOSA TO-can assembly can be manufactured quickly to meet market demand for greater bandwidth. In addition, well-established active alignment or passive alignment processes for TO-can devices can be used to perform such alignment in the WDM TOSA TO-can assemblies.

Illustrative, or exemplary, embodiments will now be described with reference to FIGS. 1-4, in which like reference numerals represent like components, elements or features. It should be noted that elements, features or components shown in the figures are not necessarily drawn to scale, emphasis instead being placed on demonstrating principles and concepts of the invention.

Figure 1:
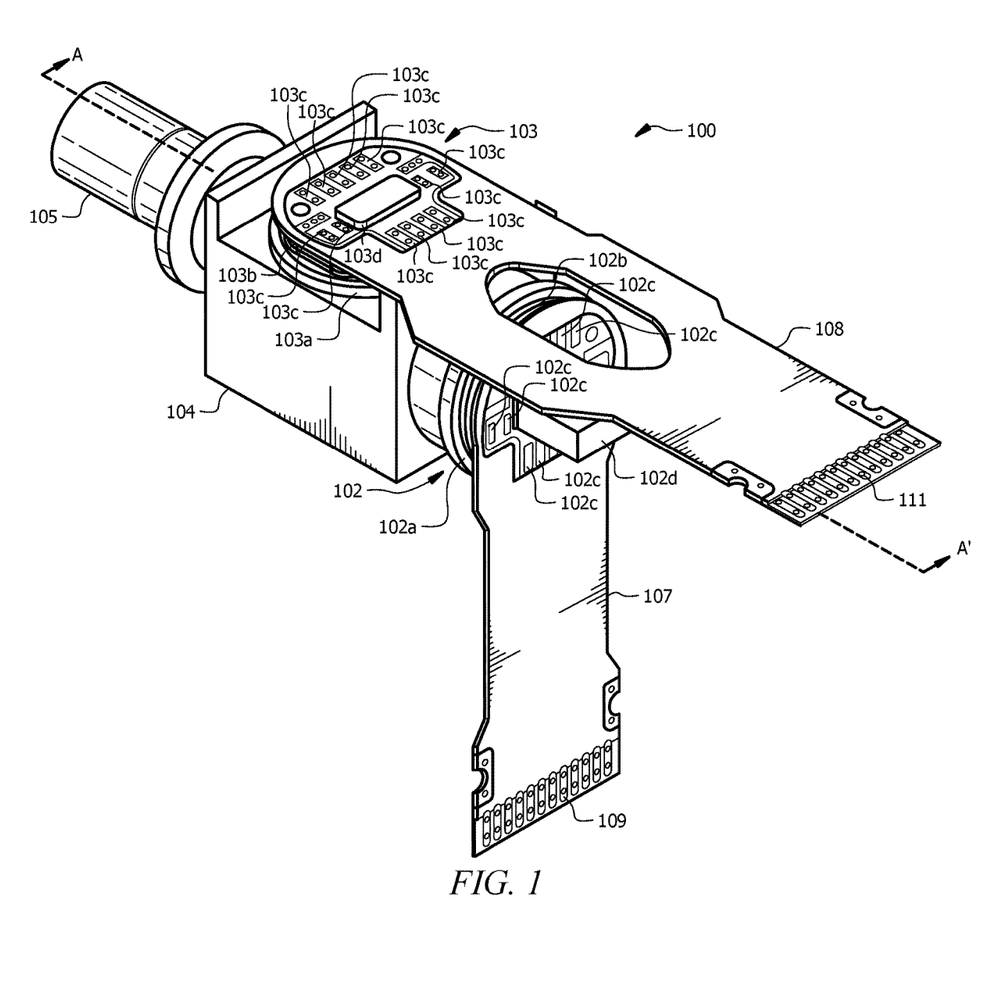
FIG. 1 illustrates a top perspective view of the WDM TOSA TO-can assembly in accordance with an exemplary embodiment.
Figure 2:
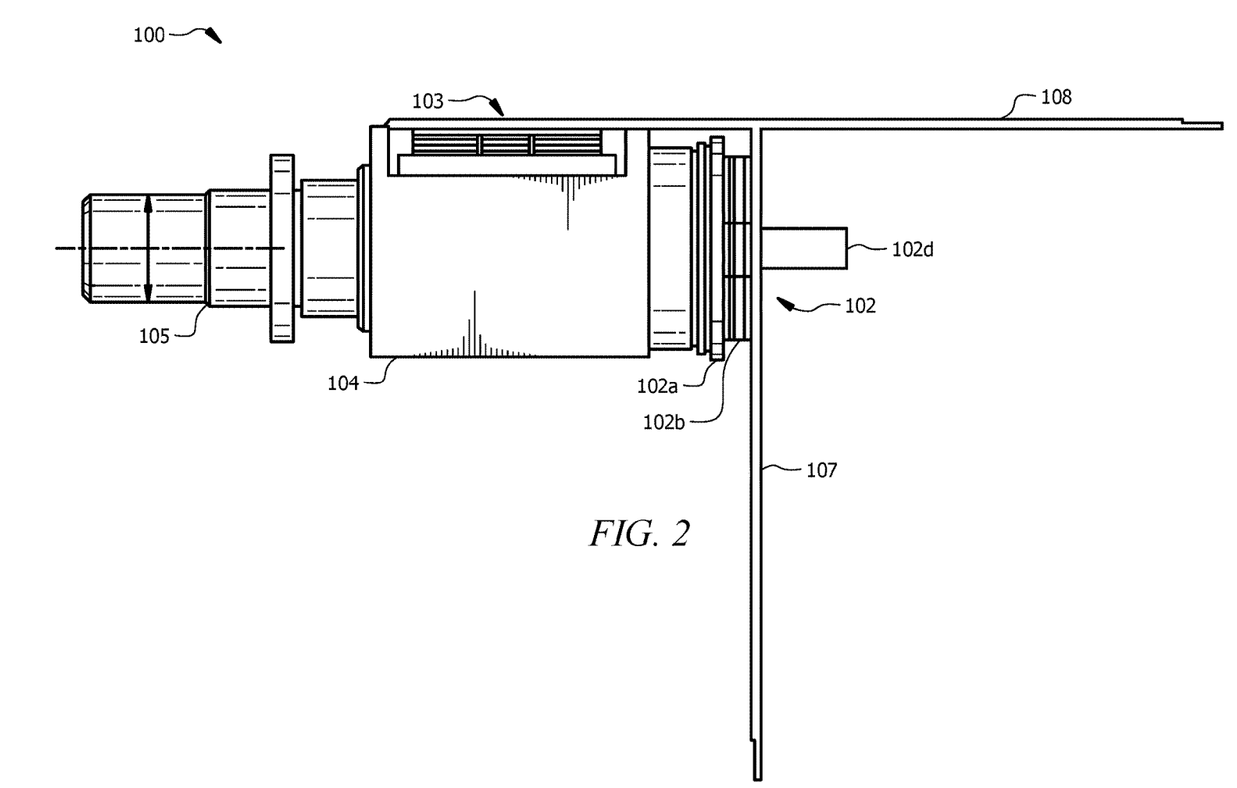
FIG. 2 illustrates a side plan view of the WDM TOSA TO-can assembly shown in FIG. 1.

FIG. 1 illustrates a top perspective view of the WDM TOSA TO-can assembly 100 in accordance with an exemplary embodiment. FIG. 2 illustrates a side plan view of the WDM TOSA TO-can assembly 100 shown in FIG. 1. The TOSA TO-can assembly 100 has first and second TO-can devices 102 and 103, respectively, disposed in an assembly body 104. The assembly body 104 is typically an integrally formed, unitary rectangular part made of metal having generally cylindrical openings formed therein for receiving the TO-can devices 102 and 103. A receptacle 105 is disposed on a forward end of the assembly body 104. In accordance with this exemplary embodiment, the receptacle 105 is an LC receptacle configured to mate with an LC connector (not shown) disposed on an end of an optical fiber cable. The receptacle 105 has an optical axis (not shown) that is coaxial with an optical axis (not shown) of the assembly body 104. The first TO-can device 102 is disposed at a rearward end of the assembly body 104 and has an optical axis that is coaxial with the optical axes of the assembly body 104 and of the receptacle 105. The second TO-can device 103 is disposed in a side of the assembly body 104 and has an optical axis that is perpendicular to the optical axis of the first TO-can device 102.

First and second flex circuits 107 and 108, respectively, are attached on their first ends to the first and second TO-can devices 102 and 103, respectively. The second ends of the first and second flex circuits 107 and 108 have respective arrays 109 and 111 of electrical contacts thereon that are configured to be interconnected with respective arrays of electrical contacts of an external PCB, such as a module PCB of a QSFP+ module (not shown). The first TO-can device 102 has a first dual-channel laser that produces first and second light beams having first and second wavelengths λ1 and λ2, respectively. The second TO-can device 103 has a second dual-channel laser that produces third and fourth light beams having third and fourth wavelengths λ3 and λ4, respectively. As will be described below in more detail with reference to FIG. 2, these light beams are wavelength division multiplexed or polarization beam combined into an end of an optical fiber (not shown) attached to the receptacle 105.

In accordance with an illustrative embodiment, the first wavelength ranges from about 1304.5 to about 1317.5 nanometers (nm), the second wavelength ranges from about 1324.5 nm to about 1337.5 nm, the third wavelength ranges from about 1264.5 to about 1277.5 nm, and the fourth wavelength ranges from about 1284.5 to about 1297.5 nm. In accordance with an illustrative embodiment, each of the laser channels is modulated to achieve a data rate of 25.78125 Gbps, referred to hereinafter for simplicity as 25 Gbps. It should be noted, however, that the inventive principles and concepts disclosed herein are not limited to any particular wavelength ranges or data rates, as will be understood by persons skilled in the art in view of the present disclosure.

Each of the TO-can devices 102 and 103 has a generally cylindrical side wall 102a and 103a, respectively, a header 102b and 103b, respectively, mechanically coupled to the side walls 102a and 103a, respectively, a plurality of electrical contacts 102c and 103c, respectively, that extend through the headers 102b and 103b, respectively, and are partially exposed on the outer surfaces of the headers 102b and 103b, respectively, and first and second heat sink devices 102d and 103d, respectively, that protrude outwardly from and extend through the headers 102b and 103b, respectively.

Because of the compact nature of the assembly 100, the number of channels being multiplexed and the high data rates of the channels, a large amount of heat is generated inside of the assembly 100. For this reason, a robust heat dissipation solution is needed to ensure that the assembly 100 is maintained at sufficiently low temperatures to ensure that the lasers operate properly and last for their intended life expectancies. To accomplish this, in accordance with this illustrative embodiment, the headers 102b and 103b are made of a ceramic material having good thermal conductivity properties for conducting heat from the interior of the assembly 100 into the heat sink devices 102d and 103d, respectively, which are thermally coupled to external heat sink devices (not shown) for moving the heat away from the assembly 100. In accordance with this illustrative embodiment, this heat dissipation solution maintains the assembly at an operating temperature that ranges from about −5° Celsius (C) to +75° C. and may extend the operating temperature range to from about −40° C. to +95° C. A thermo-electrical cooler (TEC) (not shown) may be integrated into the heat dissipation solution to help achieve these temperature ranges and/or to further extend them.

Figure 3:
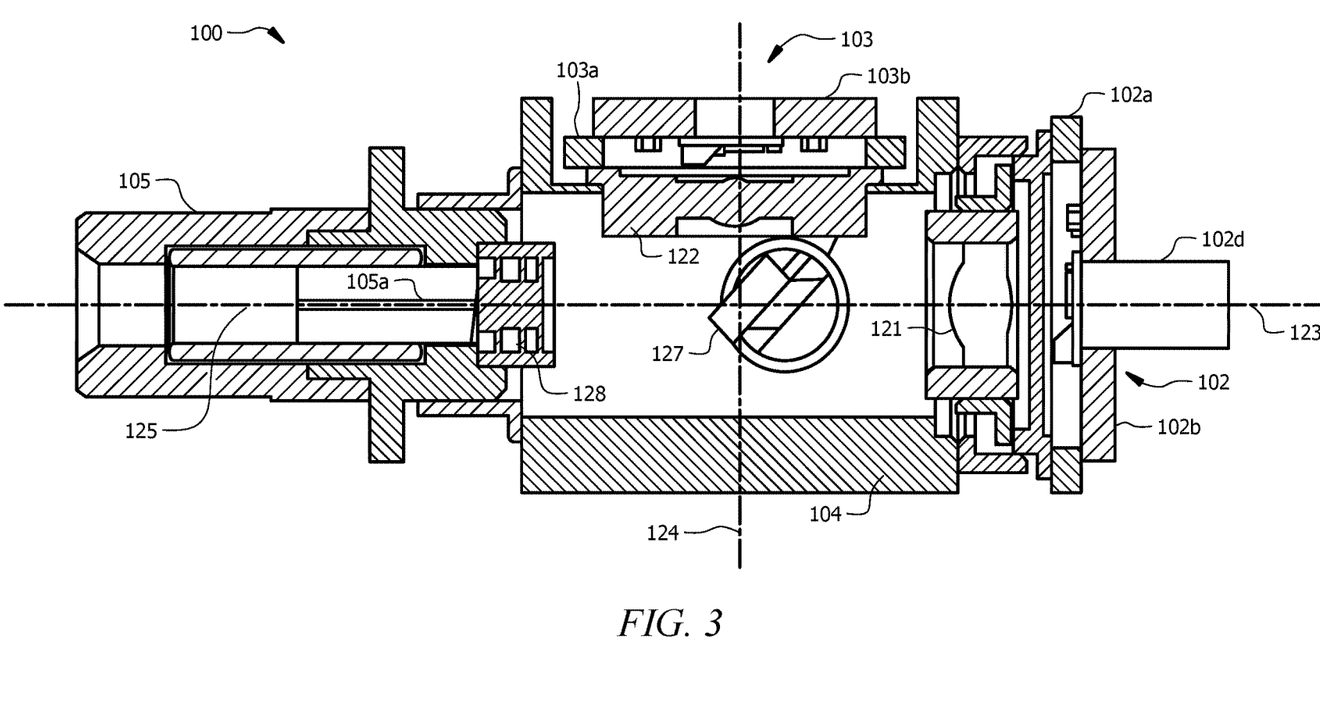
FIG. 3 illustrates a side cross-sectional view of a WDM TOSA TO-can assembly shown in FIG. 1 in accordance with an illustrative embodiment.

FIG. 3 is a cross-sectional view of the WDM TOSA TO-can assembly 100 shown in FIG. 1 taken along section line A-A' of FIG. 1, but with the flex strips 107 and 108 omitted for clarity. The assembly body 104 has first and second lenses 121 and 122, respectively, disposed in openings formed in the assembly body 104 along first and second optical axes 123 and 124, respectively, of the first and second TO-can devices 102 and 103, respectively. The assembly body 104 has an optical axis 125 that is coaxial with the first optical axis 123 of the first TO-can device 102 and with an optical axis of the receptacle 105. In accordance with this illustrative embodiment, the second optical axis 124 of the second TO-can device 103 is perpendicular to the optical axes 123 and 125. A 45° coarse WDM (CWDM) filter 127 is securely positioned at an intersection of the axes 124 and 125. In accordance with another embodiment, a polarization beam combiner (not shown) is used in place of the CWDM filter 127.

As will be described below with reference to FIG. 4, a first dual-channel laser chip (not shown) of the first TO-can device 102 generates and optically combines first and second light beams of the first and second wavelengths $\lambda 1$ and $\lambda 2$, respectively, into a first dual-wavelength light beam and emits the dual-wavelength light beam along the first optical axis 123 in a direction toward the first lens 121. A second dual-channel laser chip (not shown) of the second TO-can device 103 generates and optically combines third and fourth light beams of the third and fourth wavelengths $\lambda 3$ and $\lambda 4$, respectively, into a second dual-wavelength light beam and emits the second dual-wavelength light beam along the second optical axis 124 in a direction toward the second lens 122.

The 45° CWDM filter 127 is transmissive to light of the first and second wavelengths $\lambda 1$ and $\lambda 2$, respectively, and therefore passes the first dual-wavelength light beam. The 45° CWDM filter 127 is reflective to light of the third and fourth wavelengths $\lambda 3$ and $\lambda 4$, and therefore reflects the second dual-wavelength light beam. In accordance with this illustrative embodiment, the orientation of the 45° CWDM filter 127 (or polarization beam combiner) is such that it reflects the second dual-wavelength light beam by an angle of 90° to direct the light beam along the optical axis 125 toward the receptacle 105. The first and second lenses 121 and 122 collimate the first and second dual-wavelength light beams, respectively. Thus, the 45° CWDM filter 127 performs a CWDM operation that combines the first and second dual-wavelength light beams into a quad-wavelength light beam and directs the quad-wavelength light beam along the optical axis 125 toward the receptacle. Instead of performing collimation operations, the lenses 121 and 122 could be focusing lenses that focus the first and second dual-wavelength light beams to appropriate respective focal points.

An optical isolator 128 disposed in a proximal end of the receptacle 105 and centered along the optical axis 125 prevents light of the quad-wavelength light beam from being back-reflected into the cavity of the assembly body 104. When the receptacle 105 is coupled to an end of an optical fiber cable (not shown), the end of the optical fiber cable is disposed inside of the ferrule 105a of the receptacle 105.

In accordance with this illustrative embodiment, the 45° CWDM filter 127 is a thin-film optical filter made using known thin-film processes. Although other types of filters made by other processes may be used, thin-film filters made by thin-film processes are desirable because they are relatively inexpensive to practice, and thus the filters made by those processes are relatively inexpensive.

Figure 4:
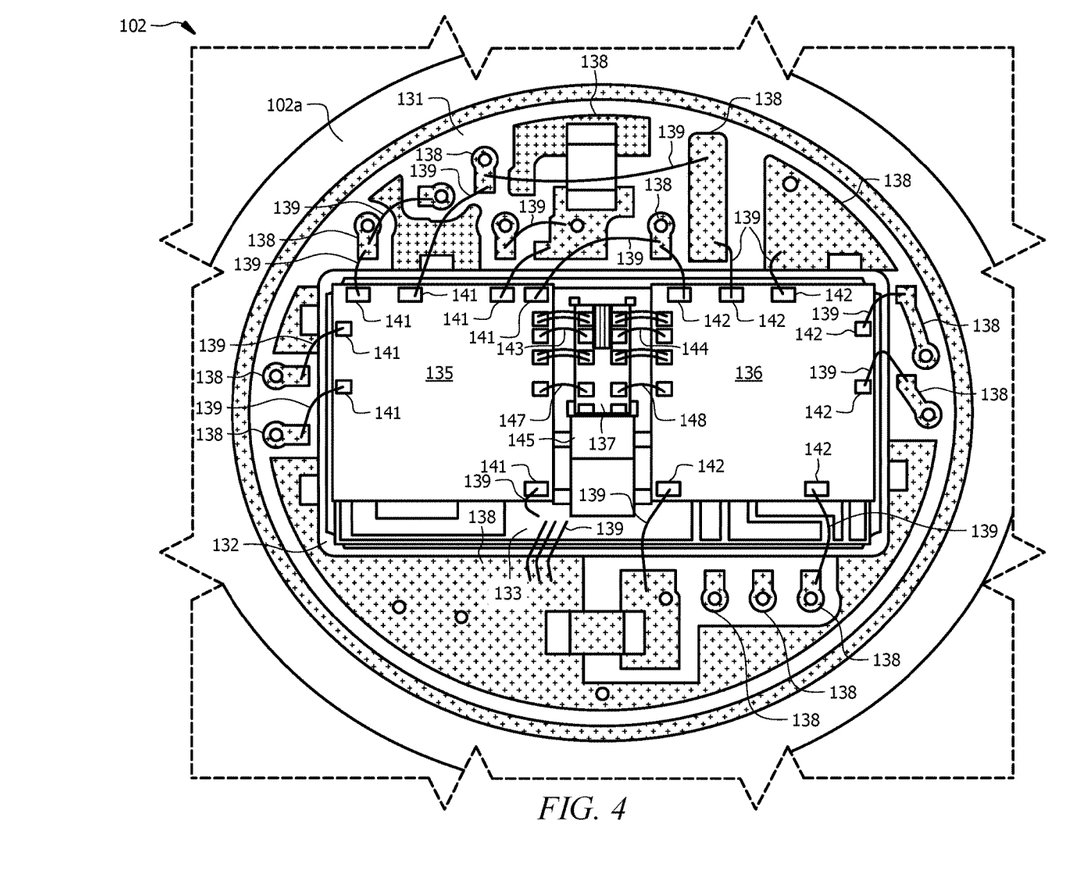
FIG. 4 illustrates a top view of plan view of an electrical subassembly (ESA) of one of the TO-can devices of the WDM TOSA TO-can assembly shown in FIG. 1 in accordance with an illustrative embodiment.

FIG. 4 is a top plan view of the interior of the first TO-can device 102 that shows a mounting surface 131 of the first TO-can device 102 surrounded by the cylindrical side wall 102a of the first TO-can device 102. An electrical subassembly (ESA) 132 is mounted on the mounting surface 131. The ESA 132 includes a carrier 133, first and second laser driver IC chips 135 and 136, respectively, mounted on the carrier 133 and a first dual-channel laser chip 137 mounted on the carrier 133. The mounting surface 131 has electrical contacts 138 on it that are electrically coupled to the electrical contacts 102c (FIG. 1). Bond wires 139 connect electrical contacts 141 and 142 of the first and second laser driver IC chips 135 and 136, respectively, to the electrical contacts 138 disposed on the mounting surface 131. First and second sets of bond wires 143 and 144, respectively, electrically connect respective electrical contacts of the first laser drive IC chip 135 and electrical contacts of the second laser driver IC chip 136, respectively, to respective electrical contacts of the first dual-channel laser chip 137.

A 45° angle reflector 145 is mounted on the carrier 133 in front of a facet (not shown) of the chip 137. In accordance with electrical drive signals delivered by the first and second laser driver IC chips 135 and 136, respectively, to the first dual-channel laser chip 137, the first dual-channel laser chip 137 generates first and second light beams of first and second wavelengths $\lambda 1$ and $\lambda 2$, respectively, and combines the first and second light beams into a first dual-wavelength light beam. In accordance with this illustrative embodiment, the chip 137 has an optical combiner integrated therein that combines the first and second light beams into the first dual-wavelength light beam. The first dual-wavelength light beam passes out of the aforementioned facet of the chip 137 and is reflected by an angle of 90° by the 45° angle reflector 145 along axis 123 (FIG. 3) toward the first lens 121 (FIG. 2), which collimates the first dual-wavelength light beam.

In accordance with an illustrative embodiment, the chip 137 has first and second monitor photodiodes that receive respective portions of the first and second light beams, respectively, and generate respective first and second monitor electrical signals, respectively, that are delivered by bond wires 147 and 148, respectively, to the first and second laser driver IC chips 135 and 136, respectively. The first and second laser driver IC chips 135 and 136 adjust the modulation and/or bias currents of the lasers of the chip 137 based on the first and second monitor electrical signals, respectively.

The second TO-can device 103 has an ESA (not shown) and interior that are identical to those of the first TO-can device 102 shown in FIG. 4. Therefore, the second TO-can device 103 performs the same functions described above to cause the second dual-wavelength light beam to be directed along axis 124 (FIG. 3) toward the second lens 122 (FIG. 3), which collimates the second dual-wavelength light beam. The CWDM filter 127 (FIG. 3) then multiplexes the first and second dual-wavelength light beams into the end of an optical fiber cable connected to the receptacle 105 (FIG. 3).

In accordance with this illustrative embodiment, the assembly body 104 is about 10 millimeters (mm) in length, the receptacle 105 is about 5 mm in length, and the first TO-can device 102 is about 5 mm in height, giving the assembly 100 an overall length of about 20 mm. The assembly body 104 has a width of about 6 mm and a height of about 6 mm. The assembly 100 is not limited to having these dimensions, but they are given to demonstrate that the assembly 100 can be made small enough to enable two of the assemblies 100 to be housed in, for example, a QSFP28 module housing. Thus, an optical transmitter is provided that is capable of transmitting a quad-wavelength optical data signal, that can be packaged in smaller packages than those used for existing BOSAs and tri-OSAs, that can be manufactured without requiring a large amount of plant retooling or capital investment, and that can be made available in the market relatively quickly.

It should be noted that the invention has been described with reference to illustrative embodiments for the purposes of demonstrating inventive principles and concepts. However, as will be understood by those of skill in the art in view of the description provided herein, many modifications may be made to the illustrative embodiments without deviating from the scope of the invention. For example, while the assembly 100 has been depicted as having two dual-wavelength TO-can devices 102 and 103, the assembly 100 may have more than two dual-wavelength TO-can devices. Also, while the assembly 100 has been described as using specific wavelengths, it may use any desired wavelengths. Persons skilled in the art will understand, in view of the description provided herein, the manner in which these and other modifications may be made and that all such modifications are within the scope of the invention.

What is claimed is:

1. A wavelength division multiplexing (WDM) transistor-outline (TO)-can assembly comprising:
   an assembly body having a forward end, a rearward end opposite the forward end, and an optical receptacle on the forward end that is adapted to receive an end of an optical fiber that is capable of carrying an optical signal having at least N wavelengths of light, where N is a positive integer that is equal to or greater than four, the assembly body having a main optical axis that extends from the forward end to the rearward end; and
   at least first and second TO-can devices disposed on or formed in the assembly body, the first TO-can device being located in the rearward end of the assembly body and having an optical axis that is coaxial with the main optical axis, the second TO-can device being located in a side wall of the assembly body and having an optical axis that is at a non-zero-degree angle to the main optical axis, wherein each of the TO-can devices has at least two channels that operate at two different wavelengths of the N wavelengths; and an optics system in the assembly body, the optics system coupling light of the N wavelengths between the TO-can devices and the end of the optical fiber.

2. The WDM TO-can assembly of claim 1, wherein each TO-can device includes an optoelectronic chip having a dual-wavelength laser that generates the two different wavelengths of the N wavelengths.

3. The WDM TO-can assembly of claim 2, wherein each optoelectronic chip includes an optical combiner that combines the light of the two different wavelengths into a dual-wavelength output light beam.

4. The WDM TO-can assembly of claim 3, wherein each laser is modulated to provide a data rate of 25 Gigabits per second (Gbps) such that a 100 Gbps light beam is coupled by the optics system into the end of the optical fiber.

5. The WDM TO-can assembly of claim 3, wherein each TO-can device includes at least first and second laser driver integrated circuit (IC) chips, each laser driver IC chip driving the respective laser to achieve a particular data rate.

6. The WDM TO-can assembly of claim 5, wherein each TO-can device has a ceramic header.

7. The WDM TO-can assembly of claim 6, wherein each TO-can device includes one of a collimating lens and a focusing lens.

8. The WDM TO-can assembly of claim 3, wherein each TO-can device includes at least one laser driver integrated circuit (IC) chip that drives the lasers of the respective TO-can device.

9. The WDM TO-can assembly of claim 3, further comprising:
   a wavelength division multiplexing (WDM) filter disposed along the main optical axis, wherein the WDM filter passes the dual-wavelength output light beam generated by the first TO-can device and redirects the dual-wavelength output light beam generated by the second TO-can device onto the main optical axis toward the end of the optical fiber.

10. The WDM TO-can assembly of claim 9, wherein the optics system includes an optical isolator that prevents or reduces back reflection of light from the end of the optical fiber back into the TO-can assembly.

11. The WDM TO-can assembly of claim 9, wherein each TO-can device further includes a power monitoring photodetector for monitoring optical power levels of the lasers.

12. The WDM TO-can assembly of claim 3, further comprising:
   a polarization beam combiner disposed along the main optical axis, wherein the polarization beam combiner passes the dual-wavelength output light beam generated by the first TO-can device and redirects the dual-wavelength output light beam generated by the second TO-can device onto the main optical axis toward the end of the optical fiber.

13. The WDM TO-can assembly of claim 1, wherein the WDM TO-can assembly has a form factor that allows it to be housed in a quad small form factor pluggable (QSFP)-type optical communications module.

14. The WDM TO-can assembly of claim 1, wherein the WDM TO-can assembly has a form factor that allows it to be housed in a C form factor pluggable (CFP)-type optical communications module.

15. An optical communications module comprising:
   a module housing:
      a module circuit board disposed in the module housing; and
      a transistor outline (TO)-can assembly disposed in the module housing, the TO-can assembly comprising:
         an assembly body having a forward end, a rearward end opposite the forward end, and an optical receptacle on the forward end that is adapted to hold an end of an optical fiber that is capable of carrying an optical signal having at least N wavelengths of light, where N is a positive integer that is equal to or greater than four, the assembly body having a main optical axis that extends from the forward end to the rearward end;
         at least first and second TO-can devices disposed on or formed in the assembly body, the first TO-can device being located in the rearward end of the assembly body and having an optical axis that is coaxial with the main optical axis, the second TO-can device being located in a side wall of the assembly body and having an optical axis that is at a non-zero-degree angle to the main optical axis, wherein each of the TO-can devices has at least two channels that operate at two different wavelengths of the N wavelengths;
         an optics system in the assembly body, the optics system coupling light of the N wavelengths between the TO-can devices and the end of the optical fiber; and first and second electrical interfaces that interface the first and second TO-can devices with the module circuit board.

16. The optical communications module of claim 15, wherein the first and second electrical interfaces are first and second flexible (flex) circuits, respectively.

17. The optical communications module of claim 15, wherein the optical receptacle is an LC optical receptacle adapted to mate with an LC optical connector.

18. The optical communications module of claim 15, wherein each TO-can device includes an optoelectronic chip having a dual-wavelength laser that generates the two different wavelengths of the N wavelengths.

19. The optical communications module of claim 18, wherein each optoelectronic chip includes an optical combiner that combines the light of the two different wavelengths into a dual-wavelength output light beam.

20. The optical communications module of claim 19, wherein each laser is modulated to provide a data rate of 25 Gigabits per second (Gbps) such that a 100 Gbps light beam is coupled by the optics system into the end of the optical fiber.

21. The optical communications module of claim 19, wherein each TO-can device includes at least one laser driver integrated circuit (IC) chip that drives the lasers of the respective TO-can device.

22. The optical communications module of claim 15, wherein each TO-can device includes at least first and second laser driver integrated circuit (IC) chips, each laser driver IC chip driving the respective laser to achieve a particular data rate.

23. The optical communications module of claim 15, wherein each TO-can device has a ceramic header.

24. The optical communications module of claim 15, wherein each TO-can device includes one of a collimating lens and a focusing lens.

25. The optical communications module of claim 19, further comprising:
a wavelength division multiplexing (WDM) filter disposed along the main optical axis, wherein the WDM filter passes the dual-wavelength output light beam generated by the first TO-can device and redirects the dual-wavelength output light beam generated by the second TO-can device onto the main optical axis toward the end of the optical fiber.

26. The optical communications module of claim 25, wherein the optics system includes an optical isolator that prevents or reduces back reflection of light from the end of the optical fiber back into the TO-can assembly.

27. The optical communications module of claim 26, wherein each TO-can device further includes a power monitoring photodetector for monitoring optical power levels of the dual-wavelength lasers.

28. The optical communications module of claim 19, further comprising:
a polarization beam combiner disposed along the main optical axis, wherein the polarization beam combiner passes the dual-wavelength output light beam generated by the first TO-can device and redirects the dual-wavelength output light beam generated by the second TO-can device onto the main optical axis toward the end of the optical fiber.

29. The optical communications module of claim 15, wherein the optical communications module is one of a quad small form factor pluggable (QSFP)-type optical communications module and a C form factor pluggable (CFP)-type optical communications module.

* * * * *